US007930089B2

(12) United States Patent
Askew

(10) Patent No.: US 7,930,089 B2
(45) Date of Patent: Apr. 19, 2011

(54) CONTROLLER FOR A SOLENOID OPERATED VALVE

(75) Inventor: James M. Anderton Askew, Gloucestershire (GB)

(73) Assignee: Woodward Governor Company, Rockford, IL (US)

( * ) Notice: Subject to any disclaimer, the term of this patent is extended or adjusted under 35 U.S.C. 154(b) by 186 days.

(21) Appl. No.: 12/146,858

(22) Filed: Jun. 26, 2008

(65) Prior Publication Data

US 2009/0005955 A1 Jan. 1, 2009

(30) Foreign Application Priority Data

Jun. 28, 2007 (GB) .................................. 0712538.8

(51) Int. Cl.

| | |
|---|---|
| ***F02D 41/30*** | (2006.01) |
| ***H01H 9/00*** | (2006.01) |
| ***F02M 51/00*** | (2006.01) |
| ***G06F 19/00*** | (2011.01) |

(52) U.S. Cl. ......................... 701/104; 123/490; 361/154

(58) Field of Classification Search .......... 701/101–105, 701/114; 123/299, 445, 447, 476, 467, 490; 251/129.15, 129.16, 129.21; 361/152–154
See application file for complete search history.

(56) References Cited

U.S. PATENT DOCUMENTS

| | | | | |
|---|---|---|---|---|
| 4,856,482 | A | 8/1989 | Linder et al. | |
| 5,086,806 | A * | 2/1992 | Engler et al. | 137/486 |
| 5,095,945 | A * | 3/1992 | Jensen | 137/607 |
| 5,245,501 | A | 9/1993 | Locher et al. | |
| 5,375,575 | A * | 12/1994 | Ohishi et al. | 123/446 |
| 5,433,244 | A * | 7/1995 | Sule | 137/554 |
| 5,668,476 | A | 9/1997 | Archer et al. | |
| 5,951,240 | A * | 9/1999 | Mirsky et al. | 415/1 |
| 5,995,356 | A | 11/1999 | Glavmo et al. | |
| 6,237,617 | B1 * | 5/2001 | Sturman et al. | 137/1 |
| 6,557,506 | B2 * | 5/2003 | Sturman | 123/90.12 |
| 6,575,126 | B2 * | 6/2003 | Sturman | 123/90.11 |
| 2003/0010325 | A1 * | 1/2003 | Reischl et al. | 123/490 |
| 2006/0285265 | A1 | 12/2006 | Ganev et al. | |

FOREIGN PATENT DOCUMENTS

| | | |
|---|---|---|
| DE | 3624231 | 1/1988 |
| SU | 1354164 | 11/1987 |

OTHER PUBLICATIONS

Search Report under Section 17(5) for U.K. Patent Application No. GB0712538.8, dated Feb. 6, 2008.

* cited by examiner

*Primary Examiner* — Willis R. Wolfe, Jr.
*Assistant Examiner* — Johnny H Hoang
(74) *Attorney, Agent, or Firm* — Goodwin Procter LLP

(57) ABSTRACT

A controller moves a solenoid operated valve with a first solenoid operating pulse during a travel time. After a time interval, the controller applies a second pulse, which moves the valve towards its original position. The time interval may be varied, and a characteristic indicative of the return of the valve to the original position may be detected based on a comparison of the pulses.

33 Claims, 5 Drawing Sheets

Result is - faster second forward travel time. Second valve travel is advanced

Result is - similar second forward travel time. Second valve travel is not advanced

CONTROLLER FOR A SOLENOID OPERATED VALVE

RELATED APPLICATIONS

This application claims priority to, and the benefit of, United Kingdom patent application Serial No. GB0712538.8, filed on Jun. 28, 2007, entitled "Controller for a Solenoid Operated Valve."

FIELD OF THE INVENTION

This invention relates to a controller for a solenoid operated valve and in particular but not exclusively, solenoid operated fuel injector valves, and valves used in diesel fuel injectors.

BACKGROUND OF THE INVENTION

The solenoid is often combined with a two-position valve, whereby the valve is pulled by the solenoid (when energized) and returned by a spring (when de-energized). The valve attached to the solenoid can be closed in one position and open in the second position, or it can be a changeover valve with two seats. In some applications, such as fuel injectors, it is desirable to measure and control the timing of the opening and closing positions of the solenoid operated valves.

Diesel fuel injectors need to have precise operating times. The valve determines the injection timing and also the injection duration (quantity of fuel) injected into a cylinder of a diesel engine. The performance of the engine (balance between cylinders, power, fuel consumption, emissions) is thus affected.

Known means exist to measure the impact point of the solenoid valve at the end of the energized stroke. For example Woodward U.S. Pat. No. 6,889,121 describes one such means. In this way the first (energized) travel time of the solenoid valve motion can be measured. It is desirable also to measure the impact of the solenoid valve at the end of the de-energized stroke. Thus information relating to the duration of the solenoid operation can be obtained for helping to control the amount of fuel supplied. This is particularly useful when the duration is short (as in diesel pilot injections)—small variations in duration can give large percentage variations in the output of a pilot injection.

A method of measuring the de-energized impact point is described in GB 2 110 373. In this patent specification, the method tries to measure the end of the solenoid movement by detecting a small change in the current to the solenoid caused by the back EMF when the solenoid stops moving (at the end of the de-energized stroke). This is very hard because of the small size of the change. Part of the reason for the small size of the change is that the gap between the solenoid armature and the stator is relatively large after de-energization. Often detecting this small current change is not possible because there is no current flowing at this time, and thus no change can be measured.

A further method is described in U.S. Pat. No. 5,650,909 in which a small current is added (to the solenoid) after the main current has been switched off. This is done to overcome the limitation above. The current must be small so that it does not affect the valve motion. Again there is difficulty in reliably measuring the small changes.

A yet further method involves adding a transducer to measure the valve motion directly. This can be a movement transducer or a pressure transducer (measuring some function of the valve attached to the solenoid). However, adding additional transducers considerably increases the system cost, and also increases complexity.

The Woodward U.S. Pat. No. 6,889,121 describes how to measure the end of the forward (energized) motion of the solenoid, and using this to control solenoid timing. This does not attempt to measure the solenoid return stoke. Changes in the operating conditions or parameters of the valves within a fuel injection system, for example wear, can lead to changes in the time of the valve return stroke. This in turn can lead to changes in the amount of fuel injected for a supply pulse of given duration and thus also to variations in the performance of the valves of a fuel injection system.

SUMMARY OF THE INVENTION

It is an aim of the present invention to alleviate the aforementioned problems and in particular to provide for accurate timing measurements in order to improve solenoid operated valve performance in, for example: fuel injection systems including diesel fuel common rail injector systems; diesel unit injectors; petrol injection solenoids; solenoids of the two-position type; particularly fast acting solenoids; solenoids for precise dosing of fluids; pilot valves for larger actuators; engine air intake and exhaust valves (if actuated, not cam driven); valves used in suspension or braking.

According to the present invention, there is provided a controller comprising: means for supplying a first solenoid operating pulse for moving a valve from a first state to a second state, the movement from the first to the second state defining a travel time of said valve; means for supplying a second solenoid operating pulse after a time interval following said first pulse, during which interval the valve returns towards said first state; timing means operative for varying the time interval between said first and second solenoid operating pulses representing a pair of solenoid operating pulses; and detector means for detecting a characteristic indicative of the return of the valve to said first state from said second state based on a comparison between different pairs of pulses.

In a preferred embodiment, said characteristic is an advance in said travel time of said second solenoid operating pulse in at least one pair of solenoid operating pulses relative to a previous pair. The timing means may progressively decrease or increase the time interval from an initial predetermined time interval until at least one advance in travel time is detected. This may continue progressively until a maximum advance in the travel time is detected.

In a preferred embodiment, said valve may be a valve of a fuel injector, the first solenoid operating pulse may be a first fuel injection pulse for moving the valve of the fuel injector from the first state to the second state; and the second solenoid operating pulse may be a second fuel injection pulse.

The first and second fuel injection pulses advantageously represent test pulses for use during a calibration or adjustment phase of a fuel injection system. During normal injector operation, the controller is operative to supply drive fuel injection pulses to the fuel injector during a drive phase of the fuel injection system, these drive pulses tend to be supplied singly, the test pulses being supplied in pairs. The test pulses and said drive pulses may be supplied to a plurality of fuel injection valves, whereby the controller can adjust the duration of the drive fuel injection pulses supplied to respective ones of the fuel injection valves in dependence on a comparison based on the detected advance in the travel time and a reference such as to bring an operating characteristic of the injectors into alignment with one another The preferred embodiment may include means for detecting an end point when the valve of the fuel injector reaches the second state from the first state. This end point detecting means may be configured for measuring an advance time period with reference to any timing event set or influenced by the controller such as the beginning or end of one of the test pulses, or even TDC (engine cylinder TDC). The advance time period may be taken with reference to said end point of the first fuel injection pulse or one of the beginning or end of said first fuel injection pulse.

According to a second aspect of the present invention, there is provided a method of controlling a timing of a solenoid, the method comprising: supplying a first solenoid operating pulse for moving a valve from a first state to a second state, the movement from the first to the second state defining a travel time of said valve; supplying a second solenoid operating pulse after a time interval following said first pulse, during which interval the valve returns towards said first state; varying the time interval between said first and second solenoid operating pulses representing a pair of solenoid operating pulses; and detecting a characteristic indicative of the return of the valve to said first state from said second state based on a comparison between different pairs of pulses.

In a preferred embodiment, the characteristic is an advance in said travel time of said second solenoid operating pulse in at least one pair of solenoid operating pulses relative to a previous pair. The method may include the step of progressively decreasing or increasing the time interval so that said detector means detects a maximum advance in said travel time. Alternatively, the change in the time interval may be in any order, that is to say, it could vary randomly, or step up and down in turn.

In a preferred embodiment, said valve may be a valve of a fuel injector, the first solenoid operating pulse may be a first fuel injection pulse for moving the valve of the fuel injector from the first state to the second state; and the second solenoid operating pulse may be a second fuel injection pulse. The first and second fuel injection pulses represent test pulses for use during a calibration or adjustment phase of a fuel injection system. The method may include supplying drive fuel injection pulses to the fuel injector during a drive phase of the fuel injection system and adjusting the duration of the drive fuel injection pulses supplied to the fuel injector in dependence upon the detected advance in the travel time.

The method may further include supplying said test pulses and said drive pulses to a plurality of fuel injection valves and adjusting the duration of the drive fuel injection pulses supplied to respective ones of the fuel injection valves in dependence on a comparison based on the detected advance in the travel time and a reference such as to bring an operating characteristic of the injectors into alignment or conformity with one another.

The method advantageously includes detecting an end point when the valve of the fuel injector reaches the second state from the first state, and measuring, on detection of said advance, an advance time period with reference to the first fuel injection pulse and the detection of said end point corresponding to the second fuel injection pulse.

Insofar as they apply to fuel injection systems, embodiments of the invention allow for the drive fuel supply pulses to be individually adjusted in time so that the 'end stop to end stop' timing of the valves within the fuel supply system can be standardised with reference to a predetermined characteristic. This characteristic may be that the valves have the same 'end stop to end stop' timing values and that these are substantially equal to a predetermined reference. Periodic calibration of the valves can therefore be carried out so as to achieve an adaptive control capability in the engine management system to which the controller is applied, thereby improving engine performance. The (electronic) controller of the solenoid can perform this calibration task in an algorithm on a periodic basis. For a number of solenoids, the start and stop times of the current pulses can then be set so that the performance of all the solenoids can be matched. In this way the performance of a diesel engine (that uses many injectors, each with a solenoid) can be improved.

Further advantages may arise from embodiments of the invention as follows: closer matching of pilot injection quantities; closer matching of main injection quantities; close matching of post injection quantities; improvement of engine cylinder balance; reduced engine emissions; improved fuel economy; lower hardware manufacturing costs (arising from a lower need for tight tolerances); better diagnostic checking of the solenoid valve (from greater knowledge of the solenoid performance).

Embodiments may be advantageously applied to: diesel fuel common rail injector systems; diesel unit injectors; petrol injection solenoids; solenoids of the two-position type; particularly fast acting solenoids (where the time taken to move from one state to another is less than 2 milliseconds, preferably less than 0.5 milliseconds); solenoids for precise dosing of fluids; pilot valves for larger actuators; engine air intake and exhaust valves (if actuated, not cam driven); solenoid operated valves used in suspension or braking systems.

BRIEF DESCRIPTION OF THE DRAWINGS

The invention will now be further described by way of example with reference to the accompanying drawings in which.

DESCRIPTION OF THE INVENTION

Figure 1:
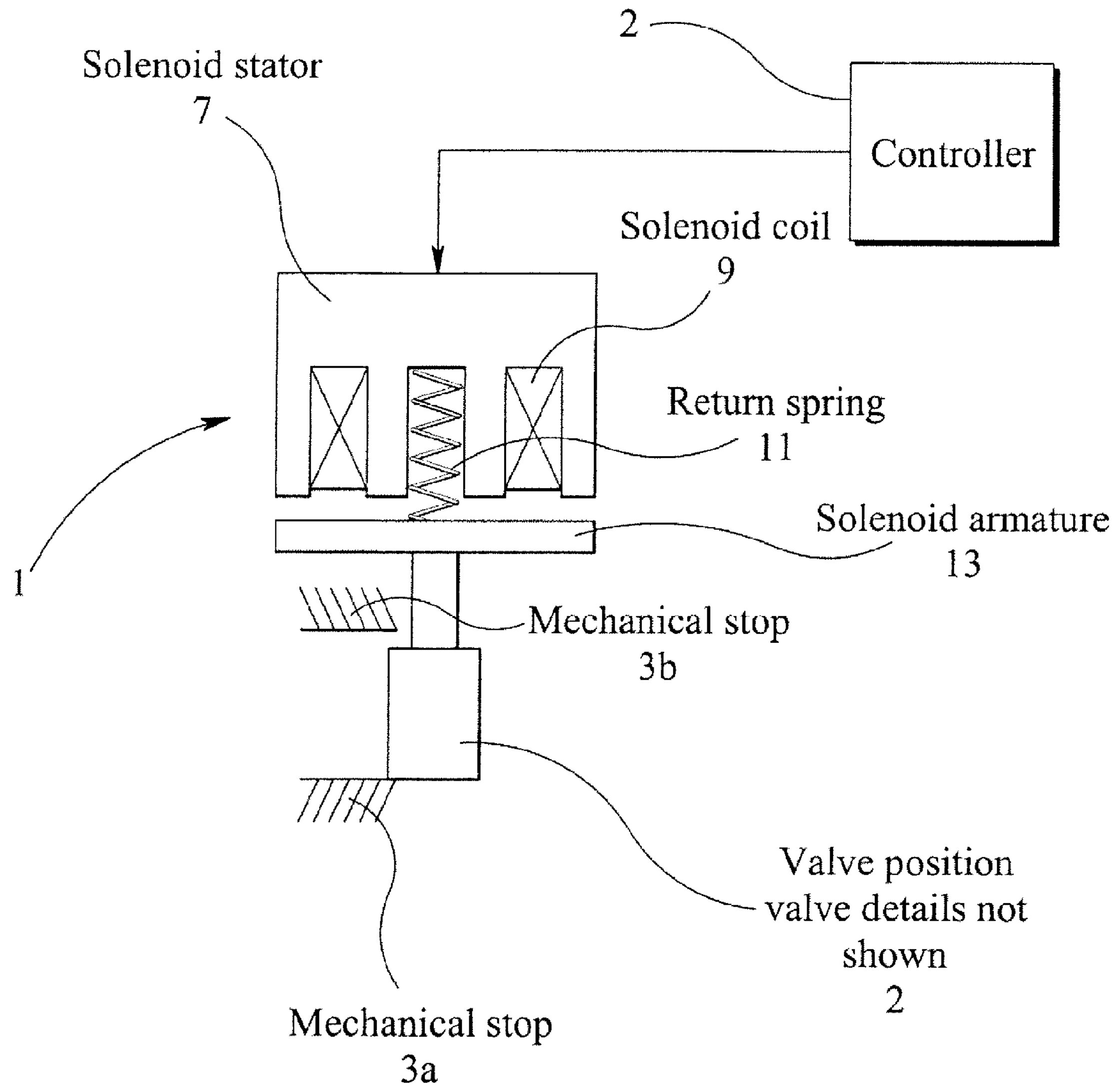
FIG. 1 is a schematic diagram of a solenoid operated valve for explaining the context of the present invention.

In FIG. 1, a solenoid valve shown generally by numeral 1 comprises a valve 2 is moveable between mechanical stops 3*a* and 3*b*. The valve 2 is driven by a solenoid having a stator 7, solenoid coil 9, return spring 11, and armature 13. This operates in accordance with conventional solenoid valves, namely, that when a current is applied to the solenoid valve 1 from a governor controller 4, the armature 13 is pulled from its stable state towards the stator 7 thus bringing the valve 2 to the mechanical stop or seat 3*b*. When the current is switched off, the return spring 11 pushes the armature 13 and hence the valve 2 back to the stop 3*a*. On impacting the stop 3*a*, it can bounce up to 10 or 20% (example percentage only) of the return travel distance. Experimental evidence shows that there may be a second and possibly a third bounce as is explained below with reference to FIG. 6. In embodiments of the invention, the valve may be of various types, for example, may have a single seat that forms one of the two mechanical stops. An alternative valve can have two seats, each of which forms a mechanical stop.

Figure 2:
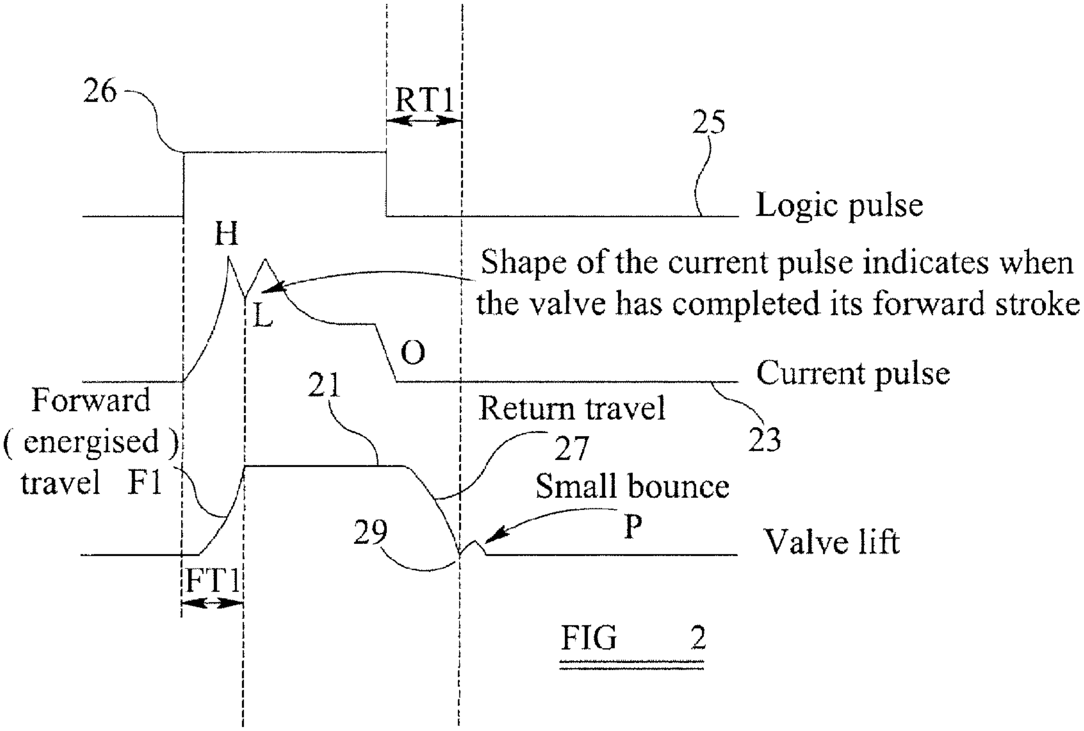
FIG. 2 shows a profile of a valve lift for a given logic pulse and supply current pulse according to the prior art.

The solenoid operated valve of FIG. 1 may be used to control the valve in a fuel injector. Although FIGS. 2 to 7 below are described with reference to the control of a fuel injector valve, the control may be applied to other situations such as: solenoids of the two-position type; particularly fast acting solenoids; solenoids for precise dosing of fluids; pilot valves for larger actuators; engine air intake and exhaust valves (if actuated, not cam driven); solenoid operated valves used in suspension or braking systems. An example of a solenoid valve assembly that may be employed in embodiments of the present invention is one manufactured by Woodward Diesel Systems and known as "Balanced Valve Assembly", part number G50010255. This is used in a unit injector. It can be operated by the controller 4. An example of a controller 4 that could be employed in embodiments of the present invention is a Woodward Diesel Systems manufactured "In-Pulse II" part number 82371006. This is a typical controller suitable for controlling solenoid valves (in fuel injection systems). In FIG. 2, a valve lift trace 21 for a fuel injector for a given current pulse 23 is shown. A "logic" pulse 25 represents the duration of the current pulse 23 supplied to the solenoid coil 9, from the controller 4, which in turn lifts the valve 2 of the fuel injector. The current pulse 23 profile versus time can take various shapes relative to the one shown in FIG. 2, depending on the drive circuitry and control used to supply the current. The profile of the current pulse 23 is such that it typically rises fast to a high value H. This causes the valve 2 to move between the first and second positions, namely, from the stop 3*a* to the stop 3*b*. When the valve 2 has reached an end point L in its forward travel F1, then the current is set to a lower value to save power (see the dip in the "M" shape part of the current pulse 23 trace in FIG. 2). The time between the start 26 of the logic pulse 25 and the end of forward travel F1 of the solenoid (where the valve lift reaches a maximum) is shown as FT1. The method of measuring the valve forward stroke as described in U.S. Pat. No. 6,889,121 is used to trace the shape of the current shown in the Figures.

After the current pulse 23 has been switched off and has fallen to zero (see point O in FIG. 2), then the valve starts to move on its return stroke, under the action of the return spring 11. The valve starts its return stroke 27 slowly and accelerates until it hits an end stop 29. The time period between the end of the logic pulse 25 and the point at which the valve 2 reaches the end stop 29 is RT1. The valve typically bounces by as much as 20% of its travel as shown by the peak P in FIG. 2.

Figure 3:
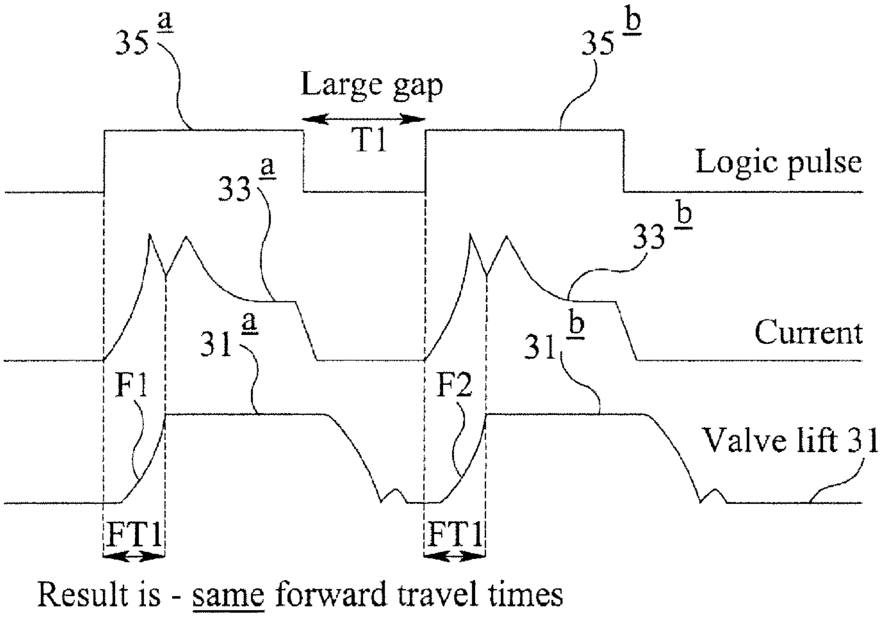
FIG. 3 shows a valve lift for a pair of consecutive supply current pulses separated by a relatively large gap in time.

FIG. 3 shows a valve lift profile 31 in a case where the current supplied to the solenoid 9 comprises a pair of consecutive current pulses 33*a*, 33*b*. These correspond to a pair of logic pulses 35*a*, 35*b* separated by a relatively large time gap T1. As is apparent from FIG. 3, the forward travel times FT1 are the same for both valve lifts 31*a*, 31*b* in this train of pulses. This is as expected. The time when the forward travel F2 of the second valve lift 31*b* has been completed depends only on the time gap T1 between the current pulses 33*a,b*. As the time gap represented by T1 between the current pulses is reduced then the forward travel F2 of the second valve lift 31*b* will be completed earlier.

Figure 4:
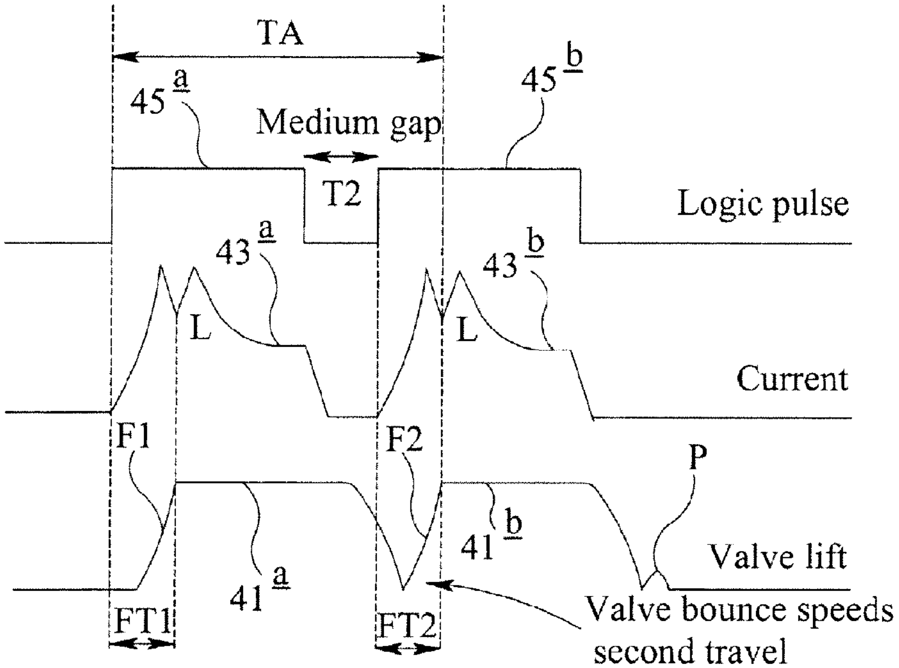
FIG. 4 shows a valve lift when the current pulses are separated by a gap of medium duration.

This is illustrated in FIG. 4 in which a time gap T2 between consecutive logic pulses 45*a* and 45*b* is reduced relative to the time gap T1 of FIG. 3. In this case, the time gap between the two current pulses is smaller, and the second forward travel time FT2 has been reduced relative to FT1. This is because the valve 2 has bounced on the end stop 29 in FIG. 2 at the end of its return stroke. Thus the valve 2 is already travelling forward, when energized with the second current pulse, and completes its second forward travel F2 quickly relative to the forward travel F1 of the first valve lift 41*a*. The second forward travel time FT2 is therefore completed (i.e. the end point L is reached earlier) in advance of that which would be otherwise expected from the timing of the two current pulses 43*a*, 43*b*. That is, there is an advance in the timing of point L in the current pulse 43*b* relative to what it would have been in the absence of the bounce. The time period Ta is thus shorter than it would have been in the absence of the bounce. The time period Ta is referenced relative to the start of the logic pulse 45*a* but could alternatively be taken from any known timing point.

Figure 5:
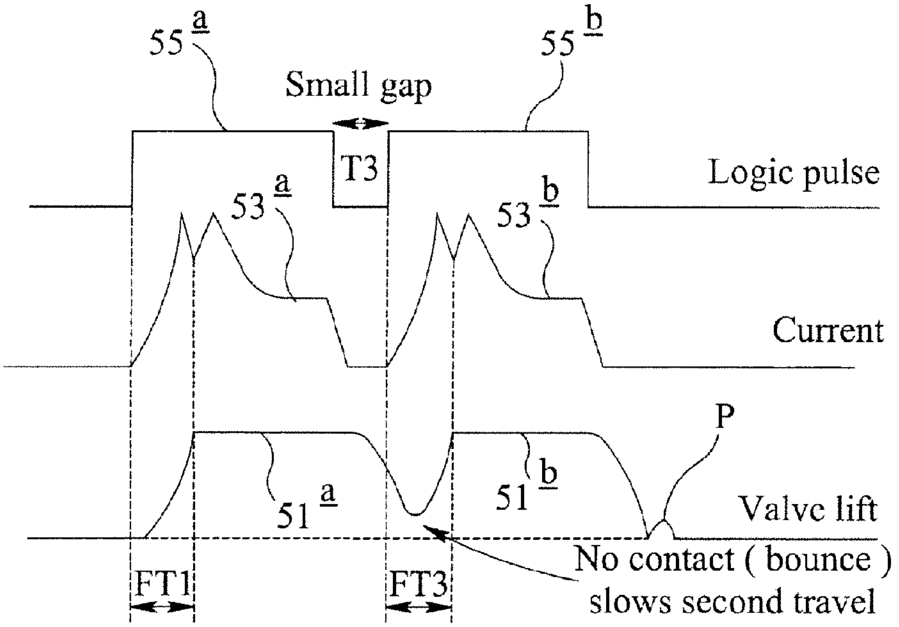
FIG. 5 shows the lift in the case of a relatively small gap between the current pulses.

FIG. 5 illustrates the case where a time gap T3 between the logic pulses 55*a*, 55*b* is reduced further relative to the time gap T1. In this case, the duration of the gap between the current pulses 53*a*, 53*b* is insufficient to allow time for the valve 2 to reach the end stop 3*a* before the solenoid is re-energised by the current pulse 53*b*. That is, the forward movement of the valve 2 is started before the return stroke of the previous pulse has finished. In this case, the valve 2 forward travel on the second lift 51*b* does not receive any assistance because of the absence of bounce at the end of the return stroke of the first lift 51*a*. Consequently, the forward travel time FT3 of the second valve lift 51*b* is similar to the forward travel time FT1 of the first valve lift 51*a*.

Figure 6:
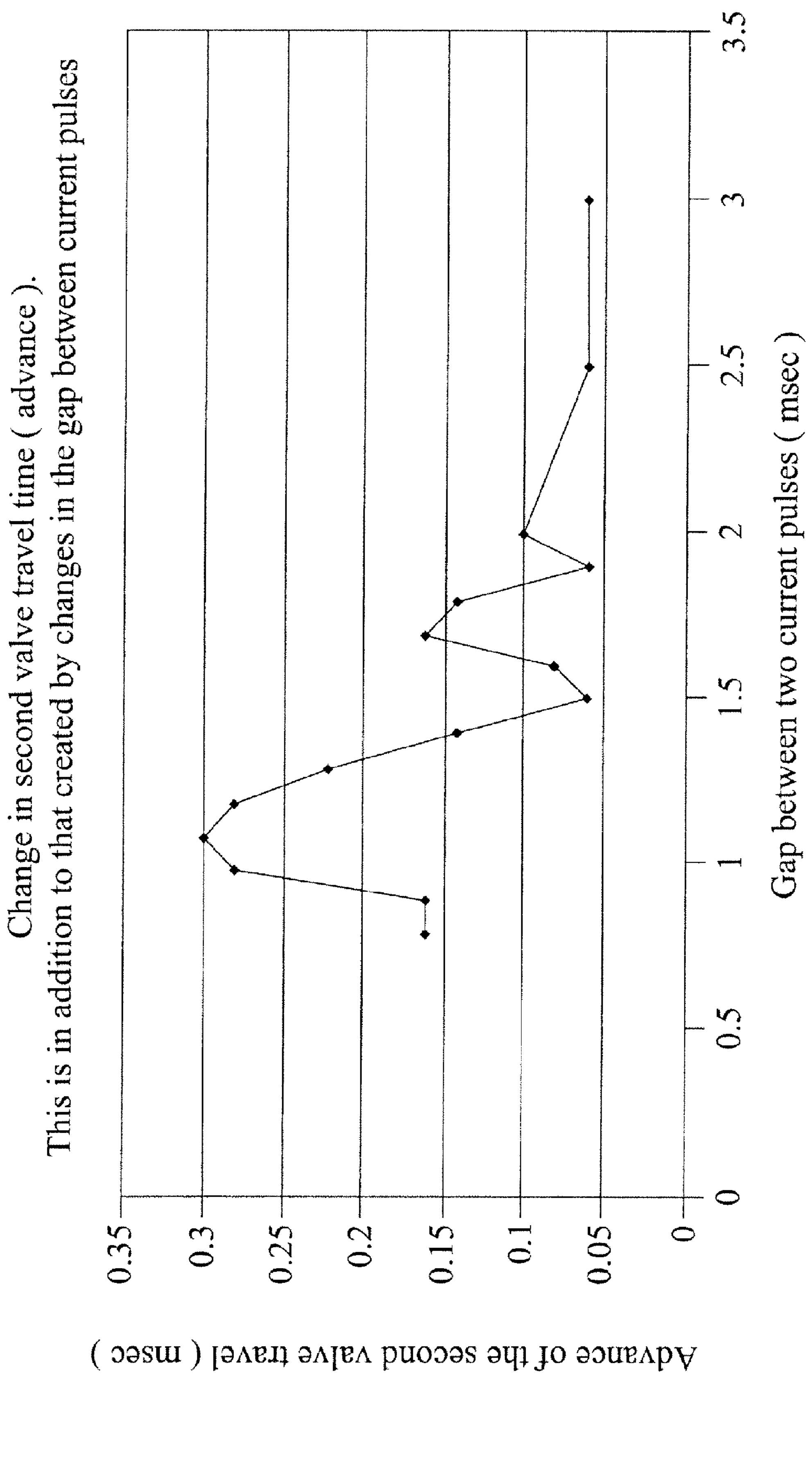
FIG. 6 is a graph showing how the second current pulse advances the valve forward travel with gap size.

FIG. 6 is a graph showing the change in forward travel time FT2 as the gap between the pair of pulses progressively decreases from a relatively large value. It shows a small peak at a gap of 2 milliseconds, suggestive of an advance in timing arising from a third bounce. As the gap decreases to about 1.7 milliseconds, a second larger peak is detected indicating a second bounce eventually reaching a maximum advance at about 1.2 milliseconds. Detection of this maximum advance is a way of determining the recent occurrence of the end of return travel of the valve 2, indicated by reference numeral 29 in FIG. 2. This allows for 'end to end point' timing to be measured for the injector valve as well as comparisons between different valves in a fuel injection system comprising many valves.

Figure 7A:
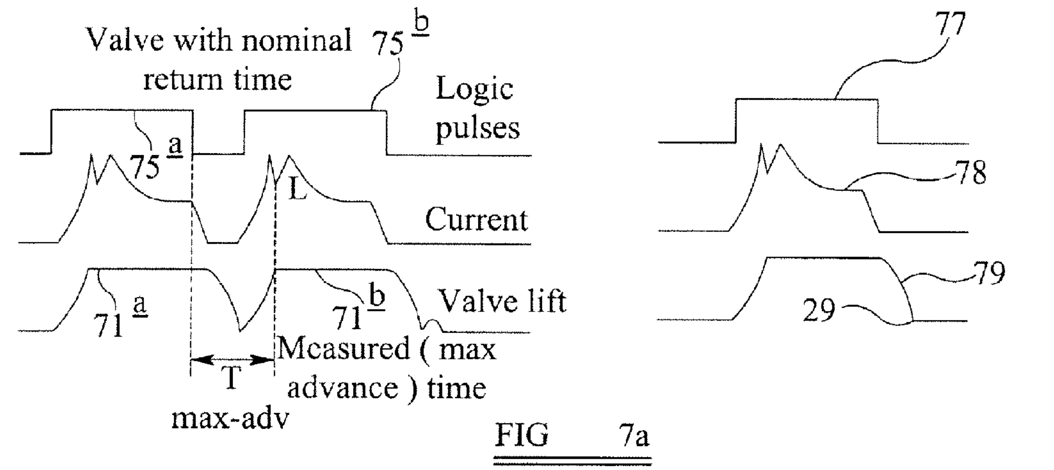
FIGS. 7*a* to 7*c* show adjustments in solenoid operated pulses to compensate for short or long valve return times relative to a standard.
Figure 7B:
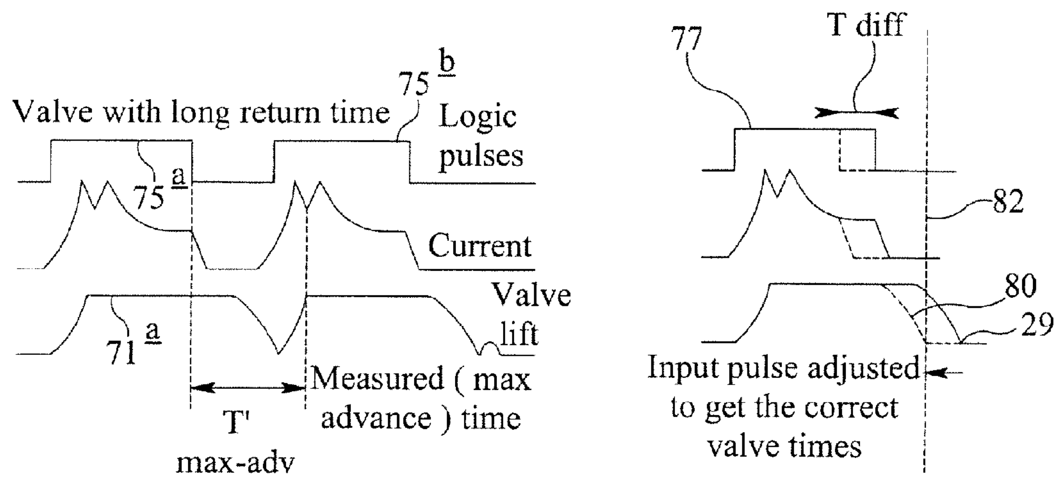
Figure 7C:
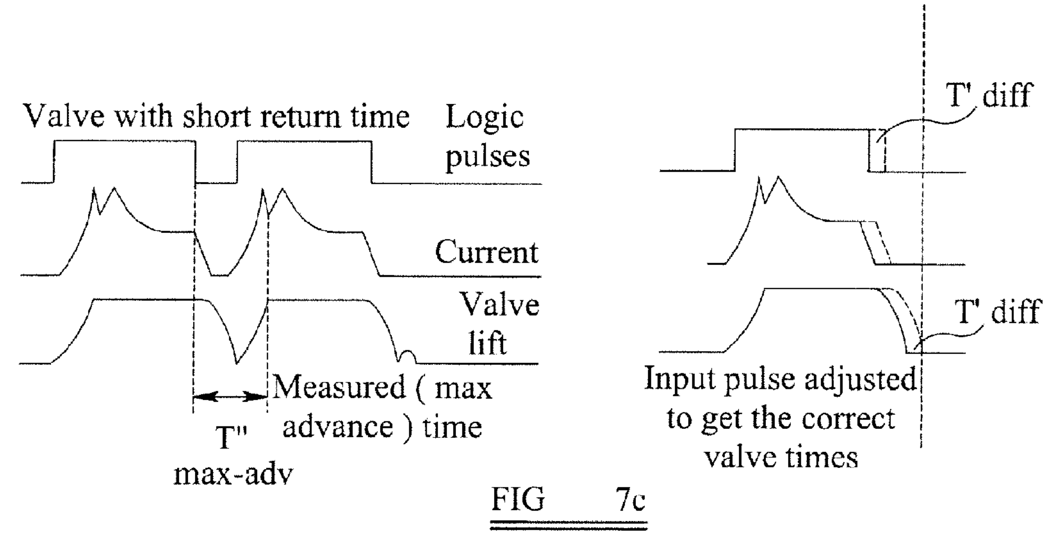

FIGS. 7*a* to 7*c* illustrate how a drive fuel injection pulse duration in respect of a valve is adjusted in order to equalise the injection timing between valves.

FIG. 7*a* corresponds to FIG. 4 in which a maximum advance time Tmax-adv is detected. In this case it is with reference to the time period between the end of the first logic pulse 75*a* and the end point L of the second valve lift 71*b*. The logic pulses 75*a* and 75*b* correspond to test fuel injection pulses for detecting the return time of the valve. FIG. 7*a* shows a drive fuel injection pulse 77 which delivers the current pulse 78, which in turn lifts the valve 2 in accordance with the lift profile 79. The value Tmax-adv corresponds to a desired reference value for the fuel injector valve, indicating that the valve is delivering the correct fuel injection quantity.

During a calibration phase of the governor controller 4, the time between the test pulses 75*a,b* is progressively decreased until a maximum advance T'max-adv is detected as shown in FIG. 7*b*. The controller 4 has a comparator (not shown) for comparing the time Tmax-adv with T'max-adv, the difference representing an increase in the return travel time of the valve return stroke relative to the valve under test in FIG. 7*a*. This increase may arise from initial manufacture, wear or other change in the operating environment of the valve. The controller 4 is operative to shorten the drive fuel injection pulse 77 for this valve by an amount Tdiff so that the return stroke follows the dotted line 80, this corresponding to the correct valve time for this valve (see dotted line 82 which shows the end point 29 shifting to coincide with the end point 29 of FIG. 7*a*.

A valve with a shorter return stoke requires a lengthening of the drive fuel injection pulse as illustrated in FIG. 7*c*. In this case, the time period T"max-adv is shorter than Tmax-adv indicating that a corresponding increase T'diff in the drive fuel injection pulse is required by the controller 4.

It is apparent that the controller 4 is operative for carrying out periodic calibration routines by applying pairs of test pulses having progressively reducing gaps between them in order to gain a comparison between the return timings, and hence 'end stop to end stop' timings. Changes in the fuel injection times of the valves can therefore be measured and compensated for on a periodic basis.

A calibration test procedure can be run when the solenoid valves are not required for normal operation, for example:

1) When the engine is not operating and no fuel pressure is present. The solenoid valve motion will not then cause any problems.
2) In a unit injector (or a pump pipe injector) the engine can be operating. In this case the test pulses can be timed to be out of phase with the cam lobe rise. Therefore no fuel will be injected into the engine cylinders.
3) It is preferable to have the engine operating and thus the temperatures and pressures are at normal levels. In this case the two test pulses can be timed to fit in the time interval of one normal drive pulse. Therefore the engine cylinder associated with the injector being tested will not be over-loaded.

The invention claimed is:

1. A controller comprising:

means for supplying a first solenoid operating pulse to a solenoid for moving a valve from a first state to a second state, the movement from the first to the second state defining a travel time of said valve;

means for supplying a second solenoid operating pulse to said solenoid after a time interval following said first pulse, during which interval the valve returns towards said first state;

timing means operative for varying the time interval between said first and second solenoid operating pulses representing a pair of solenoid operating pulses; and detector means for detecting a characteristic indicative of the return of the valve to said first state from said second state based on a comparison between different pairs of pulses.

2. A controller according to claim 1, wherein said characteristic is an advance in said travel time of said second solenoid operating pulse in at least one pair of solenoid operating pulses relative to another pair.

3. A controller according to claim 2, wherein the timing means decreases the time interval from an initial predetermined time interval until at least one advance in travel time is detected.

4. A controller according to claim 2, wherein the timing means increases the time interval from an initial predetermined time interval until at least one advance in travel time is detected.

5. A controller according to claim 3 or claim 4, wherein the timing means progressively decreases or increases the time interval so that said detector means detects a maximum advance in said travel time.

6. A controller according to claim 5, wherein the first state is when the valve is in a closed position and the second state is when the valve is in an open position or vice-versa, or alternatively the valve may be a changeover valve with two seats.

7. A controller according to claim 6, wherein the valve returns to the first state under the action of a mechanical biasing force.

8. A controller according to claim 1, wherein said valve is a valve of a fuel injector, the first solenoid operating pulse is a first fuel injection pulse for moving the valve of the fuel injector from the first state to the second state; and the second solenoid operating pulse is a second fuel injection pulse.

9. A controller according to claim 8, wherein the first and second fuel injection pulses represent test pulses for use during a calibration or adjustment phase of a fuel injection system.

10. A controller according to claim 9, wherein the controller is operative to supply drive fuel injection pulses to the fuel injector during a drive phase of the fuel injection system.

11. A controller according to claim 10, wherein the controller is operative for supplying said test pulses and said drive pulses to a plurality of fuel injection valves.

12. A controller according to claim 11, wherein the controller is operative for adjusting the duration of the drive fuel injection pulses supplied to the fuel injection valves in dependence on a comparison based on the detected advance in the travel time and a reference such as to bring an operating characteristic of the injectors into alignment or conformity with one another.

13. A controller according to claim 8, comprising means for detecting an end point when the valve of the fuel injector reaches the second state from the first state.

14. A controller according to claim 13, comprising means for measuring an advance time period with reference to any time or event set by the controller and the detection of said end point corresponding to the second fuel injection pulse.

15. A controller according to claim 14, wherein said advance time period is taken with reference to said end point of the first or second fuel injection pulse.

16. A controller according to claim 14, wherein said advance time period is taken with reference to one of the beginning of said first or second fuel injection pulse.

17. A fuel injection system for an engine comprising a controller according to claim 1.

18. Any one of: a diesel fuel common rail injector system; a diesel unit injector; a petrol injection solenoid; a solenoid of the two-position type; a particularly fast acting solenoid; a solenoid for precise dosing of fluids; a pilot valves for larger actuators; an engine air intake and exhaust valve (if actuated, not cam driven); and a valve used in suspension or braking; comprising a controller according to claim 1.

19. A method of controlling timing of a solenoid, the method comprising:

supplying a first solenoid operating pulse to a solenoid for moving a valve from a first state to a second state, the movement from the first to the second state defining a travel time of said valve;

supplying a second solenoid operating pulse to said solenoid after a time interval following said first pulse, during which interval the valve returns towards said first state;

varying the time interval between said first and second solenoid operating pulses representing a pair of solenoid operating pulses; and detecting a characteristic indicative of the return of the valve to said first state from said second state based on a comparison between different pairs of pulses.

20. A method according to claim 19, wherein the characteristic is an advance in said travel time of said second pulse in at least one pair of solenoid operating pulses relative to another pair.

21. A method according to claim 20, comprising decreasing or increasing the time interval so that said detector means detects a maximum advance in said travel time.

22. A method according to claim 19, wherein said valve is a valve of a fuel injector, the first solenoid operating pulse is a first fuel injection pulse for moving the valve of the fuel injector from the first state to the second state; and the second solenoid operating pulse is a second fuel injection pulse.

23. A method according to claim 22, wherein the first and second fuel injection pulses represent test pulses for use during a calibration or adjustment phase of a fuel injection system.

24. A method according to claim 23, comprising supplying drive fuel injection pulses to the fuel injector during a drive phase of the fuel injection system.

25. A method according to claim 24, comprising adjusting the duration of the drive fuel injection pulses supplied to the fuel injector in dependence upon the detected advance in the travel time.

26. A method according to claim 25, comprising supplying said test pulses and said drive pulses to a plurality of fuel injection valves.

27. A method according to claim 26, comprising adjusting the duration of the drive fuel injection pulses supplied to respective ones of the fuel injection valves in dependence on a comparison based on the detected advance in the travel time and a reference such as to bring an operating characteristic of the injectors into alignment or conformity with one another.

28. A method according to claim 22, comprising detecting an end point when the valve of the fuel injector reaches the second state from the first state.

29. A method according to claim 28, comprising measuring, on detection of said advance, an advance time period with reference to any time or event set by the controller and the detection of said end point corresponding to the second fuel injection pulse.

30. A method according to claim 29, comprising taking said advance time period with reference to said end point of the first or second fuel injection pulse.

31. A method according to claim 29, comprising taking said advance time period with reference to one of the beginnings of said first or second fuel injection pulse.

32. A method according to claim 27, wherein the operating characteristic is the injection timing of the injectors.

33. A controller comprising:

a first current supply controller for supplying a first solenoid operating pulse to a solenoid for moving a valve from a first state to a second state, the movement from the first to the second state defining a travel time of said valve;

a second current supply controller for supplying a second solenoid operating pulse to said solenoid after a time interval following said first pulse, during which interval the valve returns towards said first state;

a timer operative for varying the time interval between said first and second solenoid operating pulses representing a pair of solenoid operating pulses; and a detector for detecting a characteristic indicative of the return of the valve to said first state from said second state based on a comparison between different pairs of pulses.

* * * * *